US010563701B2

(12) United States Patent
Rippelmeyer et al.

(10) Patent No.: US 10,563,701 B2
(45) Date of Patent: Feb. 18, 2020

(54) METHODS AND APPARATUS FOR CLUTCH AND BRAKE DRAG REDUCTION USING SPRINGS

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Luke A. Rippelmeyer, Farmers Branch, MI (US); Hiroki Yasui, Mishima (JP)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 3 days.

(21) Appl. No.: 15/437,219

(22) Filed: Feb. 20, 2017

(65) Prior Publication Data
US 2018/0238398 A1 Aug. 23, 2018

(51) Int. Cl.
F16D 13/52 (2006.01)
F16D 13/58 (2006.01)
F16D 13/64 (2006.01)

(52) U.S. Cl.
CPC .................... F16D 13/52 (2013.01)

(58) Field of Classification Search
CPC .......... F16D 13/52; F16D 13/70; F16D 13/58; F16D 13/64
See application file for complete search history.

(56) References Cited

U.S. PATENT DOCUMENTS

| 4,466,524 | A | 8/1984 | Lane | |
| 4,958,712 | A * | 9/1990 | Suganuma | F16D 13/52 192/113.36 |
| 5,445,574 | A | 8/1995 | Sekiguchi et al. | |
| 5,803,222 | A * | 9/1998 | Arndt | F16D 55/36 192/70.2 |
| 5,911,295 | A | 6/1999 | Itonaga et al. | |
| 6,026,944 | A * | 2/2000 | Satou | F16D 13/52 192/70.2 |
| 6,227,340 | B1 | 5/2001 | Braford, Jr. | |
| 6,508,337 | B1 * | 1/2003 | Esper | F16D 21/08 188/71.5 |
| 6,575,439 | B1 * | 6/2003 | Costello | F16F 1/128 267/179 |
| 6,964,412 | B2 * | 11/2005 | Costello | F16B 21/071 267/179 |
| 9,279,460 | B2 * | 3/2016 | Qin | F16D 27/112 |
| 9,284,993 | B1 * | 3/2016 | Kalinsky | F16D 25/0635 |
| 9,416,827 | B1 * | 8/2016 | Logan | F16D 13/10 |
| 2016/0341258 | A1 * | 11/2016 | Reisch | F16D 13/648 |
| 2018/0051754 | A1 * | 2/2018 | Lindemann | F16D 13/648 |

* cited by examiner

Primary Examiner — Charles A Fox
Assistant Examiner — Tinh T Dang
(74) Attorney, Agent, or Firm — Christopher G. Darrow; Darrow Mustafa PC

(57) ABSTRACT

Described herein are various embodiments of a clutch assembly and separator plates for a clutch assembly. The clutch assembly may comprise a first separator plate; a second separator plate; and a spring coupled to the first separator plate and contacting the second separator plate, such that when compressed the spring applies a repulsive force separating the first separator plate and the second separator plate.

11 Claims, 10 Drawing Sheets

METHODS AND APPARATUS FOR CLUTCH AND BRAKE DRAG REDUCTION USING SPRINGS

TECHNICAL FIELD

The present invention relates to brake and clutch assemblies and, more particularly, to methods and apparatus for clutch and brake drag reduction using springs.

BACKGROUND

A known conventional clutch assembly may incorporate multiple friction plates and a separator plate positioned between each pair of adjacent friction plates. When the friction and separator plates are in contact with each other or "engaged", a power path is established for torque transmittal to a load (for example, the wheels of a vehicle). When the clutch is disengaged or open, it is desirable to ensure that the separator plates detach from (and remain spaced apart from) the friction plates, in order to minimize clutch drag. Clutch drag may occur in an open clutch when one or more separator plates fail to disengage from associated friction plates, or when the gap between adjacent plates is small, causing drag within the fluid layer separating the adjacent plates. Power losses through open clutch drag may be a significant source of mechanical inefficiency in automotive transmissions.

SUMMARY

Described herein are various embodiments of a clutch assembly and separator plates for a clutch assembly. In an embodiment, a clutch assembly is described. The clutch assembly may comprise a first separator plate; a second separator plate; and a spring coupled to the first separator plate and contacting the second separator plate, such that when compressed the spring applies a repulsive force separating the first separator plate and the second separator plate.

In another embodiment, a separator plate is described. The separator plate may comprise an annular portion; a plurality of tabs, the plurality of tabs angularly spaced-apart and extending from an outer edge of the annular portion; and a first spring coupled to a first tab of the plurality tabs.

In another embodiment, a method of generating a separation force between adjacent separator plates of a clutch is described. The method may comprise providing a first separator plate; providing a second separator plate; and providing a spring coupled to the first separator plate and contacting the second separator plate, such that when compressed the spring applies a repulsive force separating the first separator plate and the second separator plate.

DETAILED DESCRIPTION

Embodiments described herein relate to a clutch assembly and separator plates for a clutch assembly. Each of the separator plate embodiments incorporates one or more springs therein. As used herein, springs may include any mechanism, e.g., a helical coil or mesh, or material, e.g., rubber, that can be pressed or pulled and subsequently return to its former shape. A spring may be installed on or in a first separator plate adjacent a second separator plate. This arrangement produces a repulsive separation force between the adjacent separator plates. This separation force pushes the adjacent separator plates apart when the clutch assembly is in an open condition, thereby aiding separation of the separator plates from the clutch friction plates when the clutch is open.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
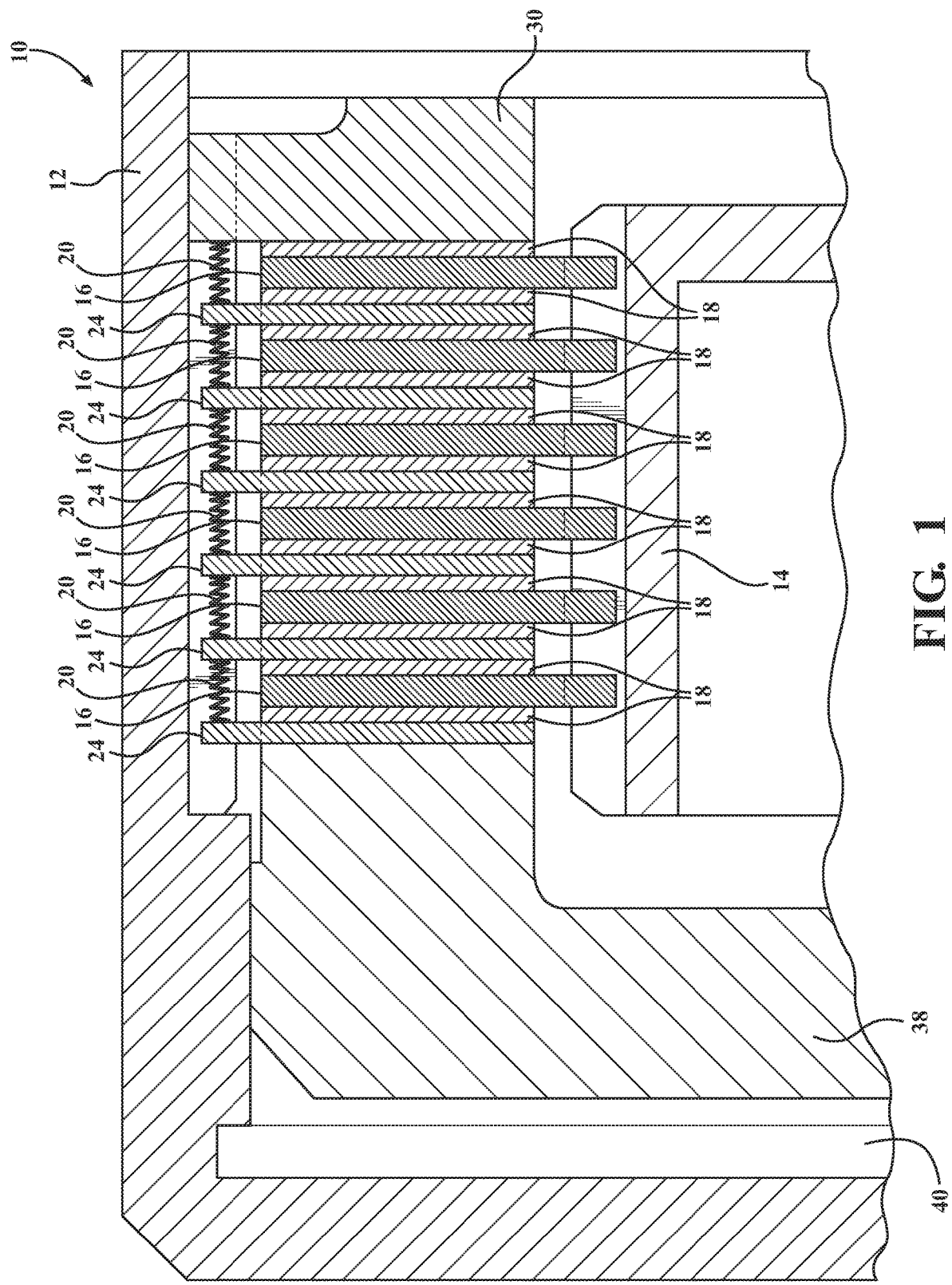
FIG. 1 is a side cross-sectional view of an embodiment of a portion of an engaged clutch assembly.

FIG. 1 shows a side cross-sectional view of a portion of a clutch assembly 10 incorporating multiple friction plates 16 and separator plates 24 positioned between each pair of adjacent friction plates, in accordance with an embodiment described herein. FIG. 1 discloses a portion of the upper half of the clutch assembly 10, which is usable in a clutch or brake for an automatic transmission of an automotive vehicle. The clutch assembly may include a rotating member 12 (for example, in the form of a metal drum formed of cast iron, steel, powdered metal or another suitable material and mounted for rotation on suitable bearings (not shown)). An internal metal hub or shaft 14 may also be also formed of one of the above materials and is suitably mounted for rotation. The drum 12 may be adapted to be driven by a torque application member (not shown) and the hub or shaft 14 may be adapted to be drivingly connected to a load (not shown) to be driven, although the driving and driven portions could be reversed.

Figure 2:
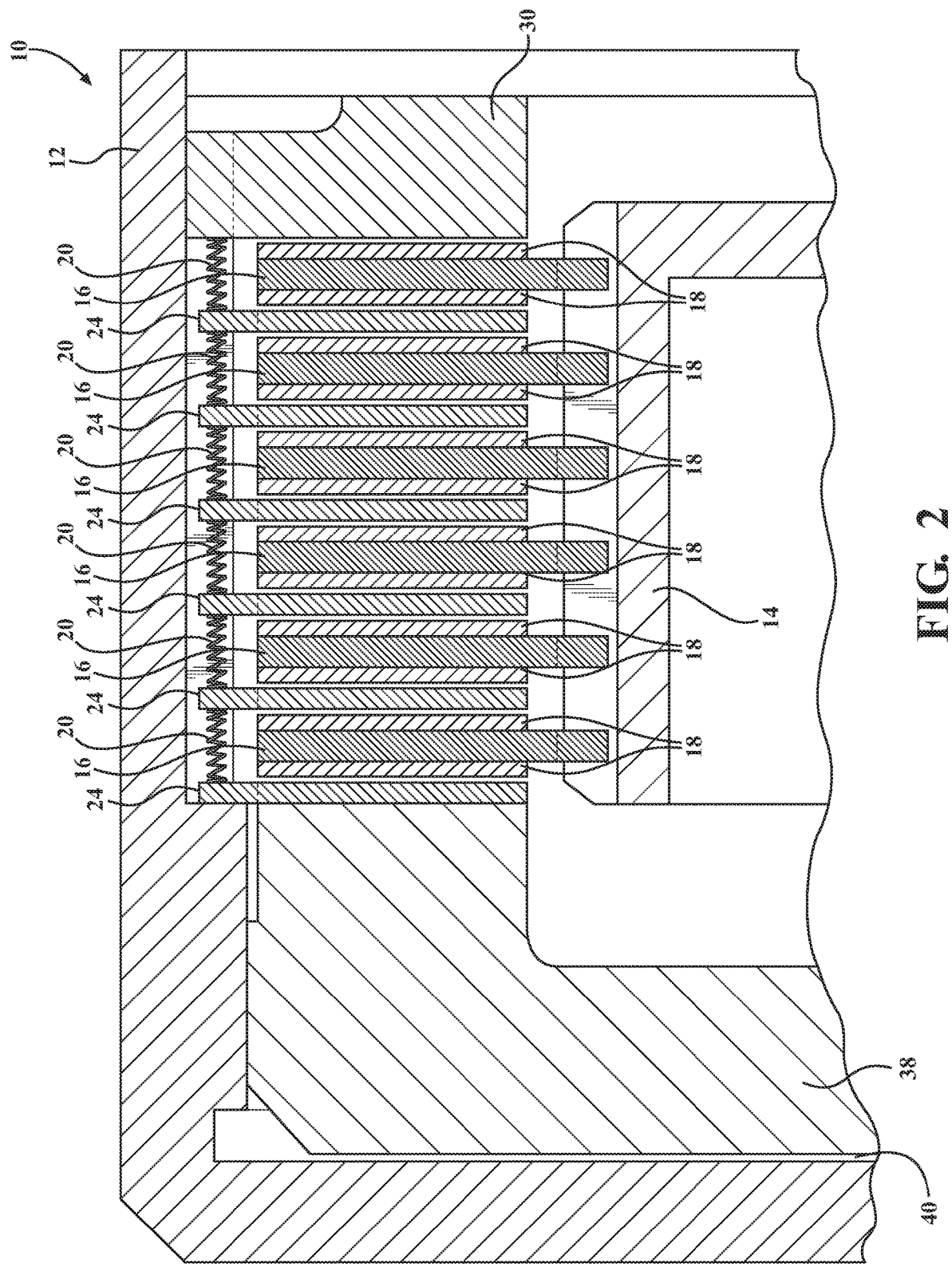
FIG. 2 is a side cross-sectional view of an embodiment of a portion of a disengaged clutch assembly.
Figure 3:
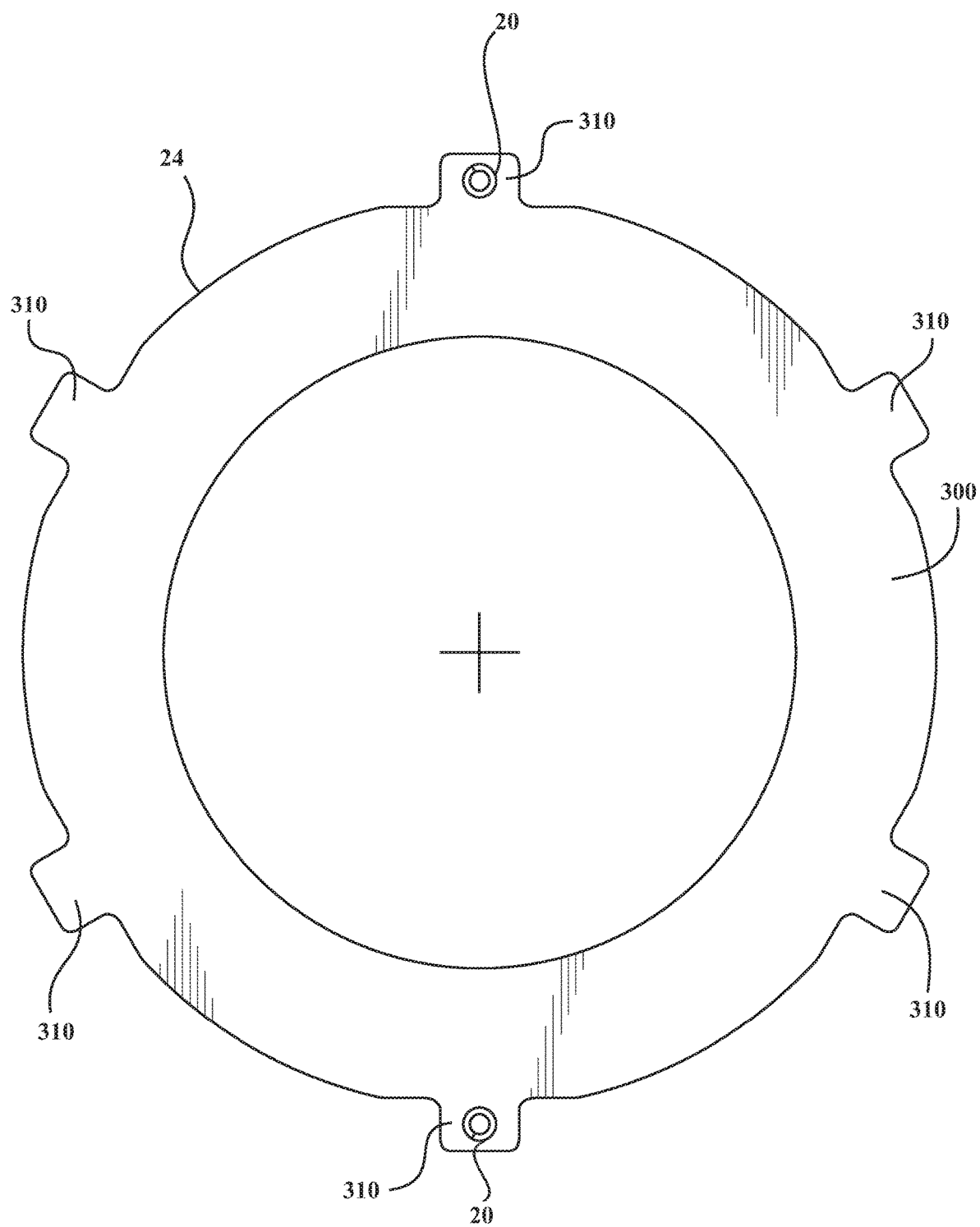
FIG. 3 is a schematic end view of an embodiment of a separator plate.

Between the drum 12 and hub 14 is located a clutch pack formed from a plurality of annular metal plates comprising alternating clutch plates or friction plates 16, and separator plates 24. The friction plates 16 may have friction linings 18 on oppositely-facing surfaces thereof. FIG. 3 shows a schematic end view of an exemplary individual separator plate 24, as may be incorporated into the embodiment of FIGS. 1 and 2. Each separator plate 24 may have an associated annular portion 300 structured for contacting at least one adjacent friction plate of the clutch assembly 10, and a plurality of angularly spaced-apart teeth or tabs 310 extending from an outer edge of the annular portion. Tabs 310 are structured to mesh with the internal splines or ribs on the interior surface of the drum 12, and to move along associated grooves defined between the ribs. Springs 20 may be installed on or through tabs 310. While two springs 20 are depicted, any number of springs may be used depending on the requirements of the clutch design. The embodiment of FIG. 3 shows six tabs on separator plate 24. However, the separator plates incorporated into a clutch pack may have any desired number of tabs, depending on the requirements of a particular clutch design. Although shown as operatively connected to a rotating member 12, the separator plates 24 could be connected to a suitable stationary member as where the coupling is applied to a brake rather than a clutch in the transmission. An annular backing plate has teeth on its periphery meshing with the drum splines and is retained axially through a retaining ring mounted in an internal annular groove in the drum.

An annular piston 38 is mounted to slide axially within the drum 12. Fluid under pressure is admitted into a chamber 40 at the left-hand end of the piston 38 (from the perspective of FIG. 1) to urge the piston 38 towards the friction plates 16 to force the friction plates 16 having opposed friction facings 18 and the separator plates 24 into contact with each other between the piston 38 and the backing plate 30 (as shown in FIG. 1). With the friction and separator plates 16, 24 engaged, a power path is established for torque transmittal between drum 12 and the hub 14.

FIG. 1 shows the clutch assembly 10 with the friction plates 16 and separator plates 24 engaged by application of pressure by piston 38. Piston 38 may be normally urged leftward (from the perspective of FIGS. 1 and 2) to a disengaged or open position as shown in FIG. 2, by clutch release springs or other suitable release means (not shown). When the fluid in the chamber 40 is allowed to exhaust or exit, the release means may move the piston 38 to the left to its disengaged position to disengage the clutch. FIG. 2 shows the clutch assembly 10 of FIG. 1 in an open state of the clutch, after piston pressure has been removed.

When piston pressure on the clutch pack is removed, it is desirable to ensure that the separator plates 24 detach from (and remain spaced apart from) the friction plates 16, in order to minimize clutch drag when the clutch is open. In embodiments described herein, springs are incorporated into the clutch separator plates. The springs on separator plates are arranged in various manners as described herein, causing repulsive forces between the separator plates. These repulsive forces can be accurately controlled and varied over a relatively wide range, according to the requirements of a particular application. As applied to separator plates of the clutch assembly embodiments described herein, a first separator plate is deemed to be "adjacent" another separator plate when the first separator plate is the separator plate closest to the other separator plate in any direction.

In clutch assembly embodiments described herein, each pair of adjacent separator plates may incorporate one or more springs arranged as previously described, with each spring arranged so that a repulsive force tending to force the first and second separator plates away from each other is generated by the compressed spring when the piston is disengaged from the clutch pack. In the embodiments of FIG. 1 and FIG. 2, the springs may be attached to the face of adjacent separator plates. The springs may be a coiled material, e.g., steel, aluminum, plastic, or some other material.

Figure 4:
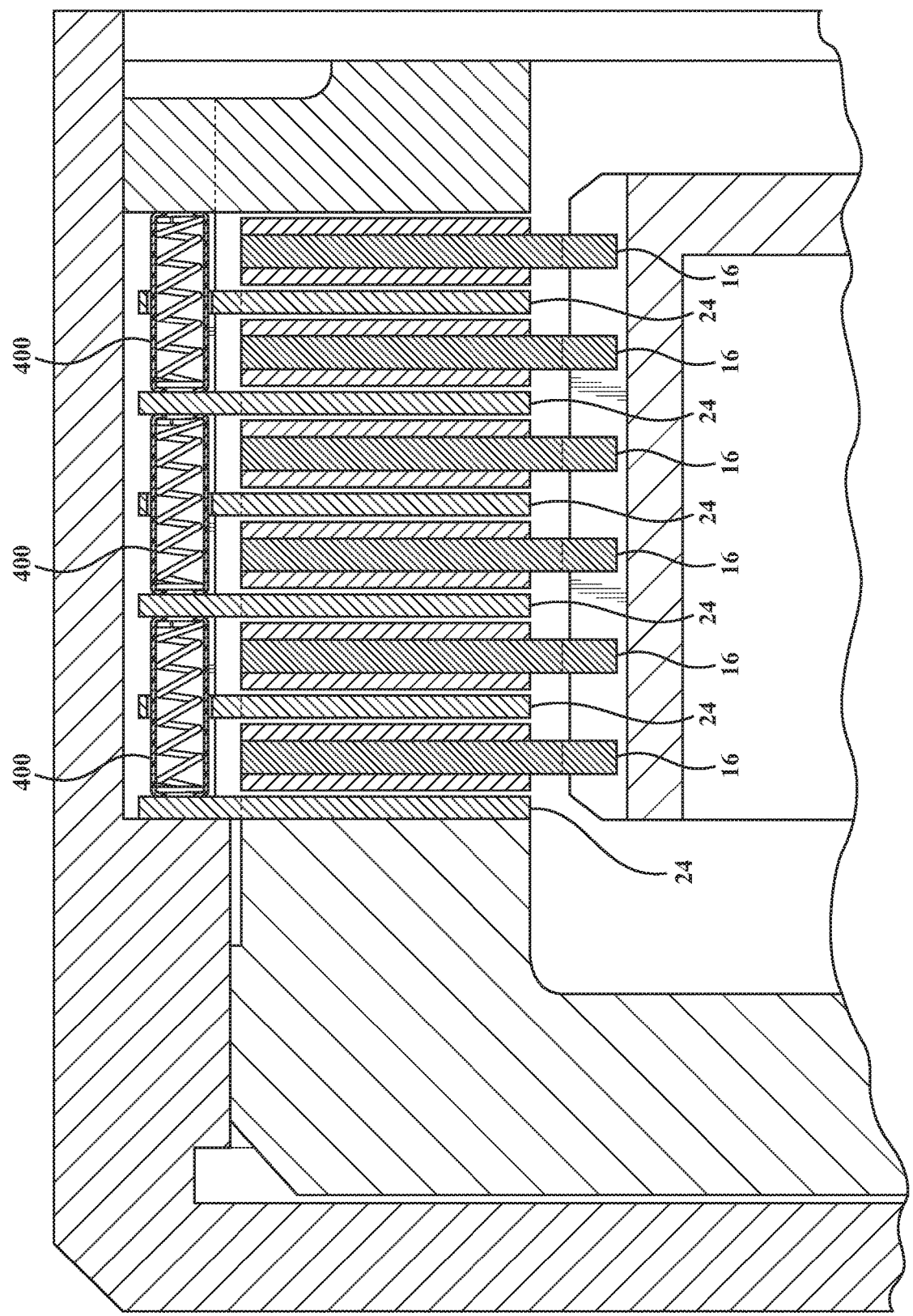
FIG. 4 is a diagram of an embodiment of separator plates with snap-in springs.

FIG. 4 is a diagram of an embodiment of separator plates with snap-in springs. In this embodiment, springs 400 may be installed in alternating separator plates 24. The spring may be installed to pass through a separator plate 24 and contact adjacent separator plates 24 to the separator plate 24 where the spring is installed. The spring 400 may be encased in a housing to facilitate installation of the spring 400. The spring 400 may snap in to a groove or opening in the separator plate 24. The spring 400 may be installed through a tab, e.g., tab 310, on separator plate 24.

Figure 5:
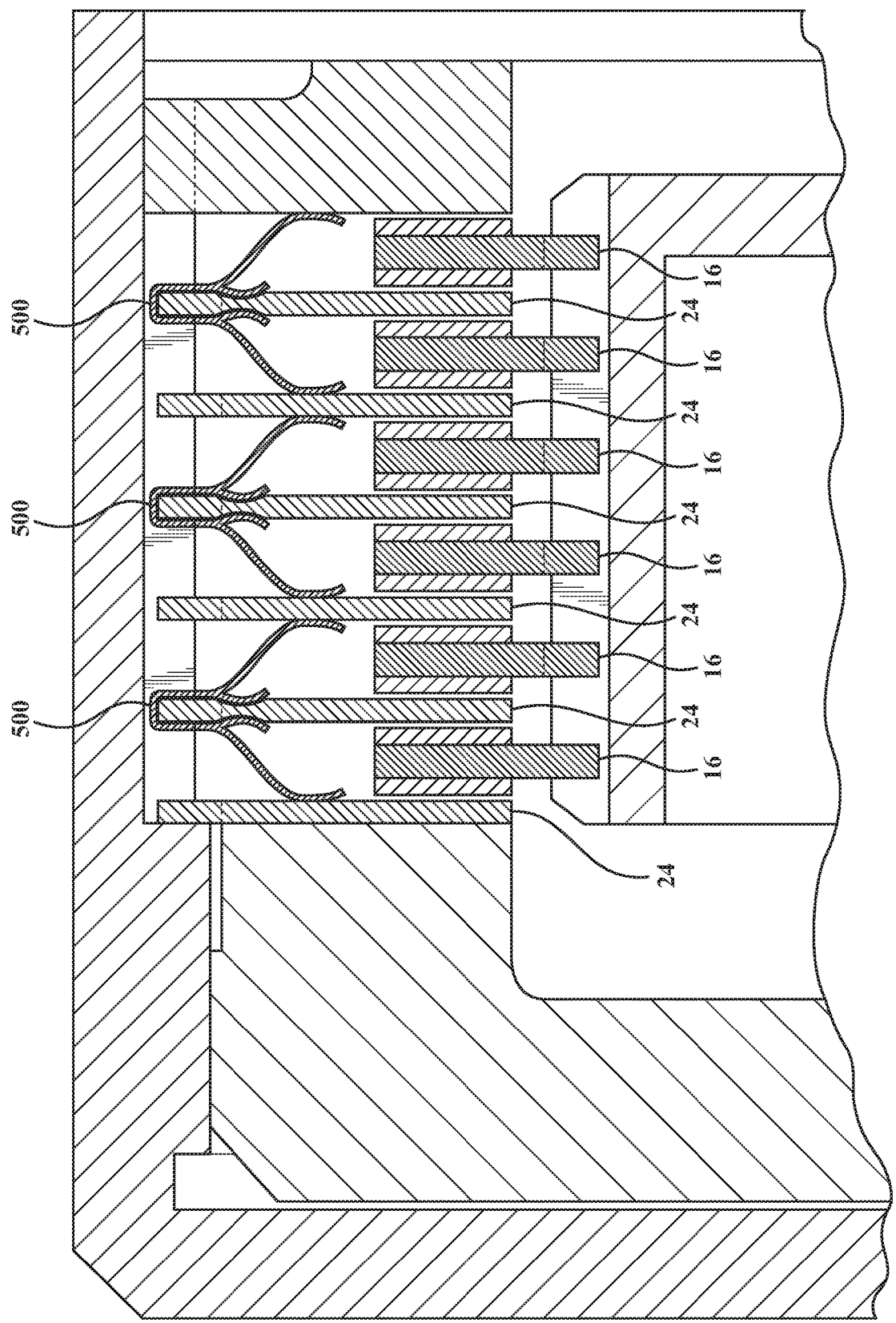
FIG. 5 is a diagram of an embodiment of separator plates with snap-on springs.

FIG. 5 is a diagram of an embodiment of separator plates with snap-on springs. In this embodiment, springs 500 may be installed on alternating separator plates 24. The spring may be installed over an outer edge of a separator plate 24 and contact adjacent separator plates 24 to the separator plate 24 where the spring 500 is installed. The spring 500 may comprise two y-shaped portions. The y-shaped portions may be curved to contact adjacent separator plates 24 and push the adjacent separator plates 24 apart. The y-shaped portions may snap in to a groove or opening in the separator plate 24. The spring 500 may be installed on a tab, e.g., tab 310, on separator plate 24.

Figure 6:
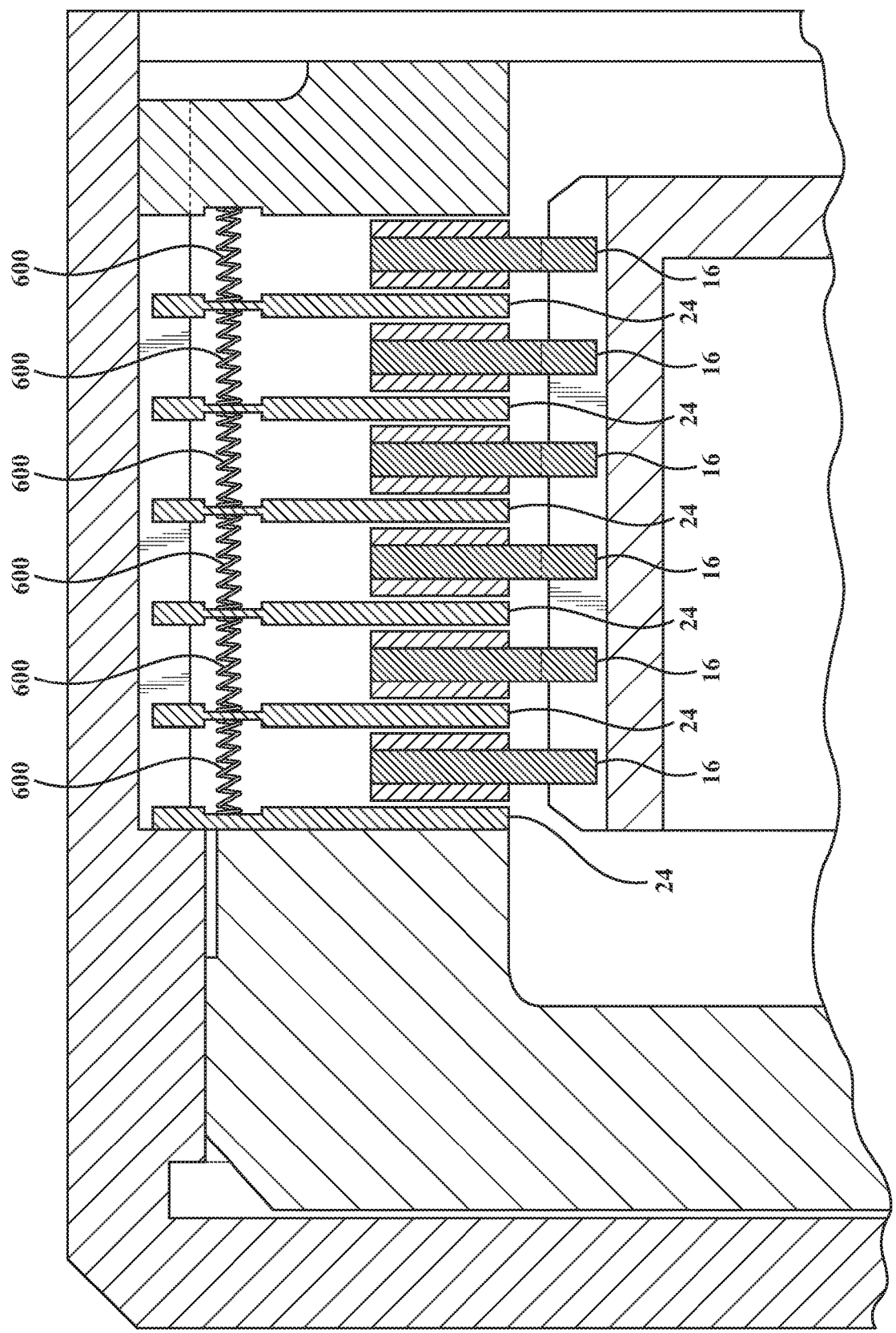
FIG. 6 is a diagram of an embodiment of grooved separator plates with springs.

FIG. 6 is a diagram of an embodiment of grooved separator plates with springs. In this embodiment, springs 600 may be installed between separator plates 24. The spring 600 may be installed in a groove or indentation in separator plate 24 and contact adjacent separator plates 24 where a similar groove or indentation may receive the spring 600. The spring 600 may be installed on a tab, e.g., tab 310, on separator plate 24.

Figure 7:
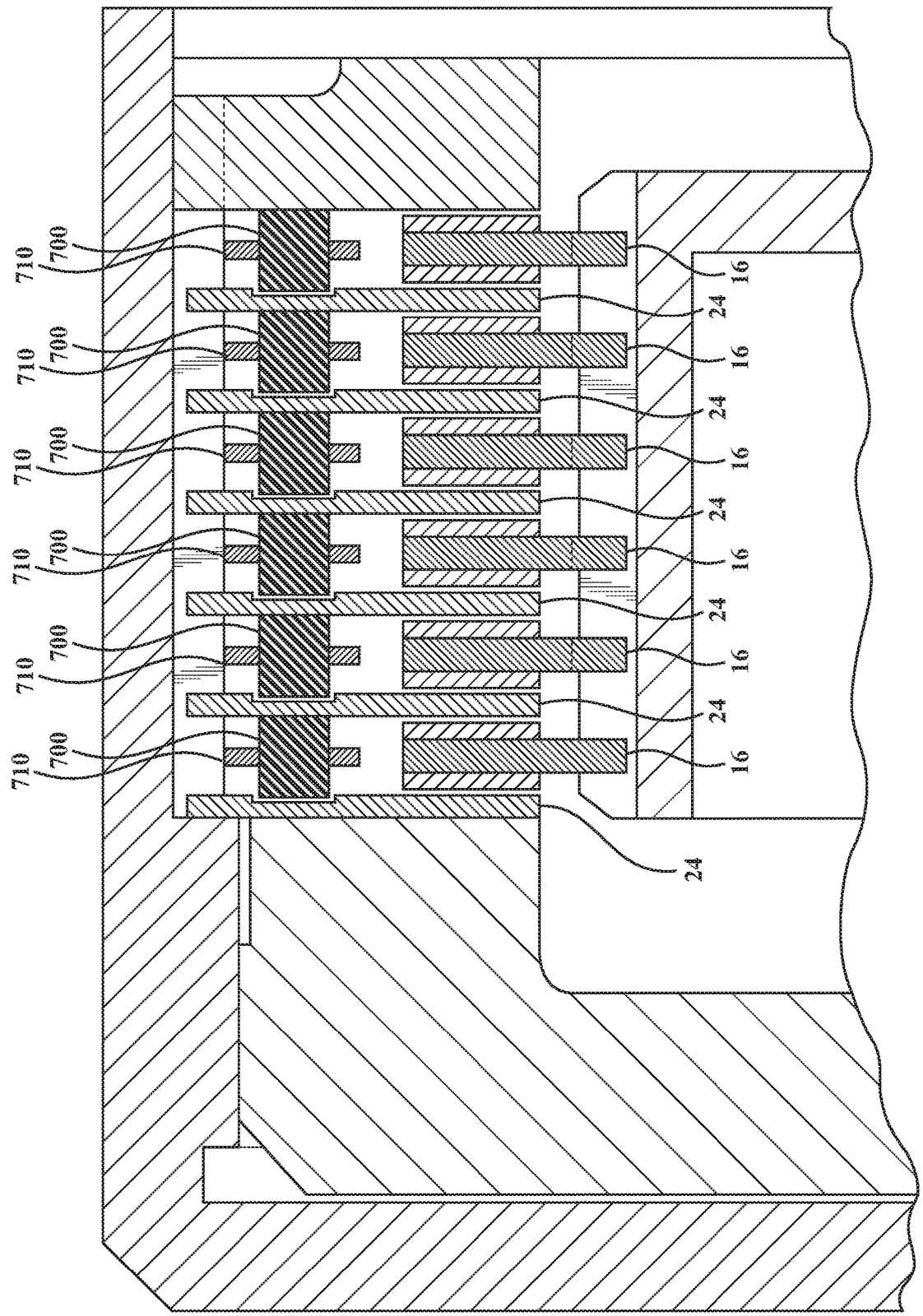
FIG. 7 is a diagram of an embodiment of separator plates with rubber springs.

FIG. 7 is a diagram of an embodiment of separator plates with rubber springs. In this embodiment, springs 700 may be between separator plates 24. The spring 700 may be seated in a groove or indentation in separator plate 24 and contact a flat surface of an adjacent separator plate 24. Spring 700 may be rubber, cork, plastic, or some other material that may be compressed and return to original shape. Spring 700 may exert pressure on the adjacent separator plate 24 when compressed. Spring 700 may be part of a spring ring 710. Spring ring 710 may be similar in shape and diameter to the diameter of separator plate 24. Spring ring 710 may be made of materials similar to those of the separator plate 24. One or more springs 700 may be mounted on spring ring 710. The spring 700 may be installed on a tab, e.g., tab 310, on separator plate 24.

Figure 8:
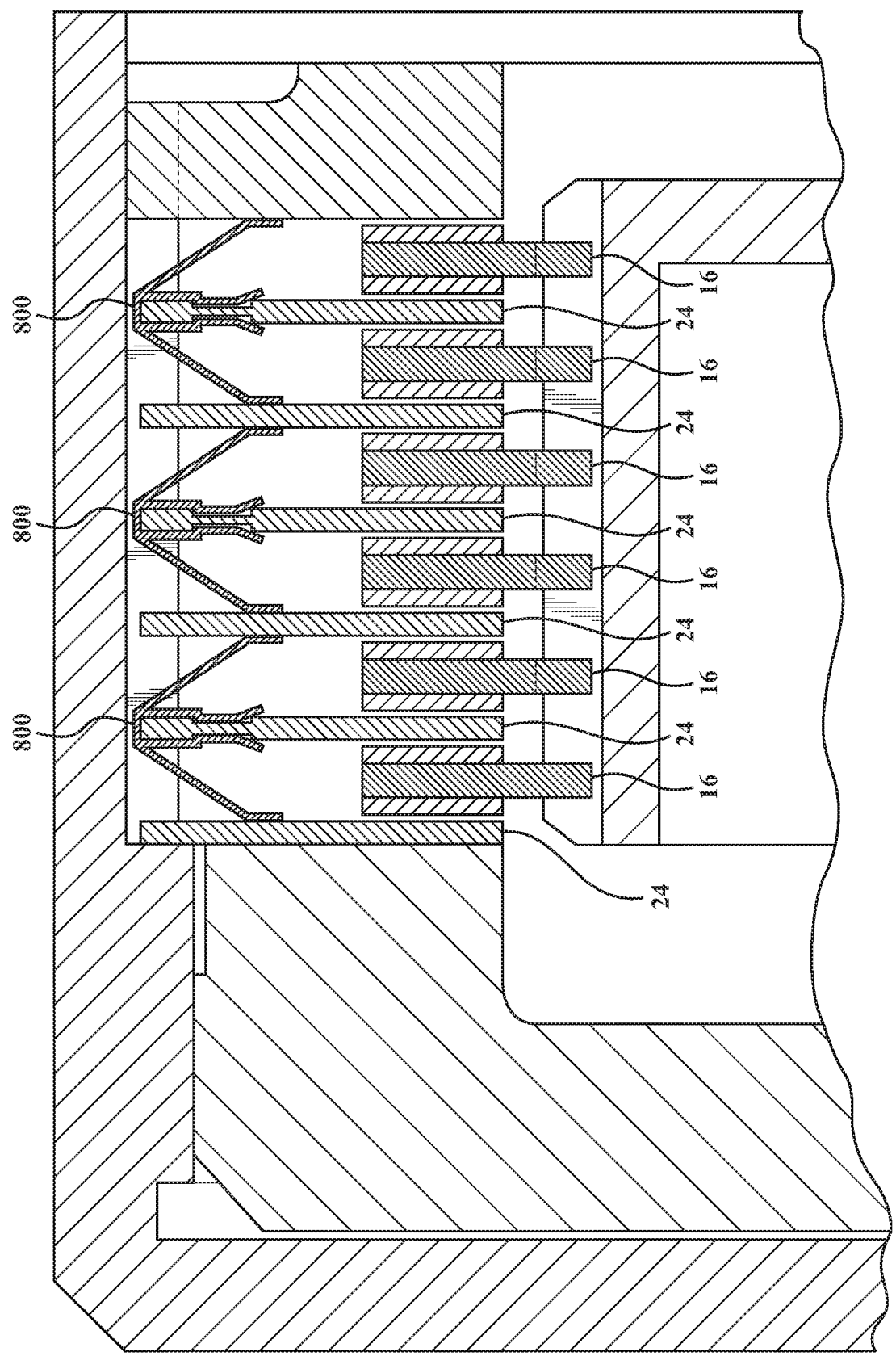
FIG. 8 is a diagram of an embodiment of separator plates with snap-on springs.

FIG. 8 is a diagram of an embodiment of separator plates with snap-on springs. In this embodiment, springs 800 may be installed on alternating separator plates 24. The spring 800 may be installed over an outer edge of a separator plate 24 and contact adjacent separator plates 24 to the separator plate 24 where the spring 800 is installed. The spring 800 may comprise two y-shaped portions. The y-shaped portions may be angled to contact adjacent separator plates 24 and push the adjacent separator plates 24 apart. The angled portions may snap in to a groove or opening in the separator plate 24. The spring 800 may be installed on a tab, e.g., tab 310, on separator plate 24.

Figure 9:
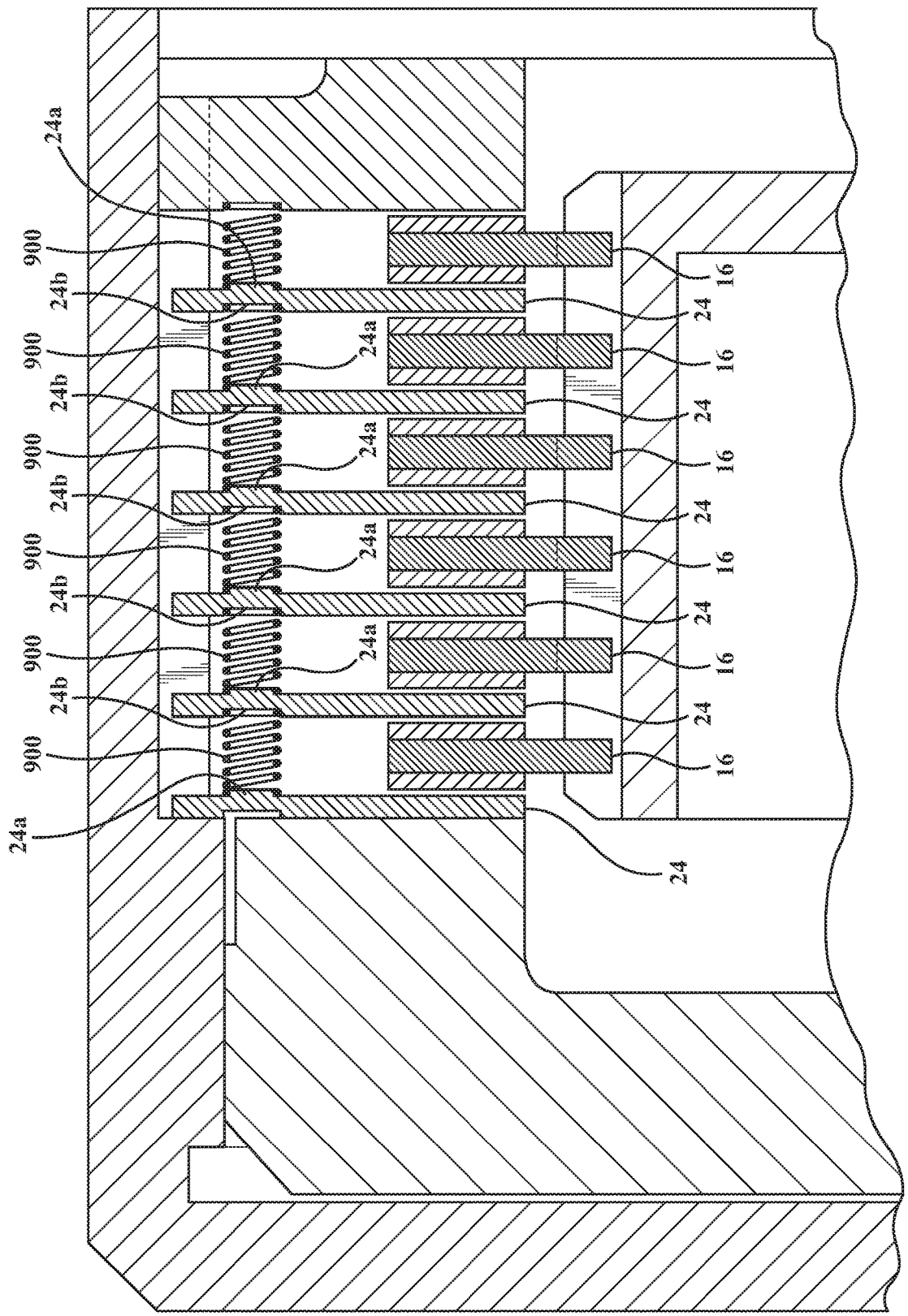
FIG. 9 is a diagram of an embodiment of separator plates with groves and ridges for springs.

FIG. 9 is a diagram of an embodiment of separator plates with grooves and ridges for springs. In this embodiment, springs 900 may be installed between separator plates 24. The spring 900 may be installed in a ridge or raised portion 24a on a separator plate 24 and contact adjacent separator plates 24 where a groove or indentation 24b may receive the spring 900. The spring 900 may be installed on a tab, e.g., tab 310, on separator plate 24.

Figure 10:
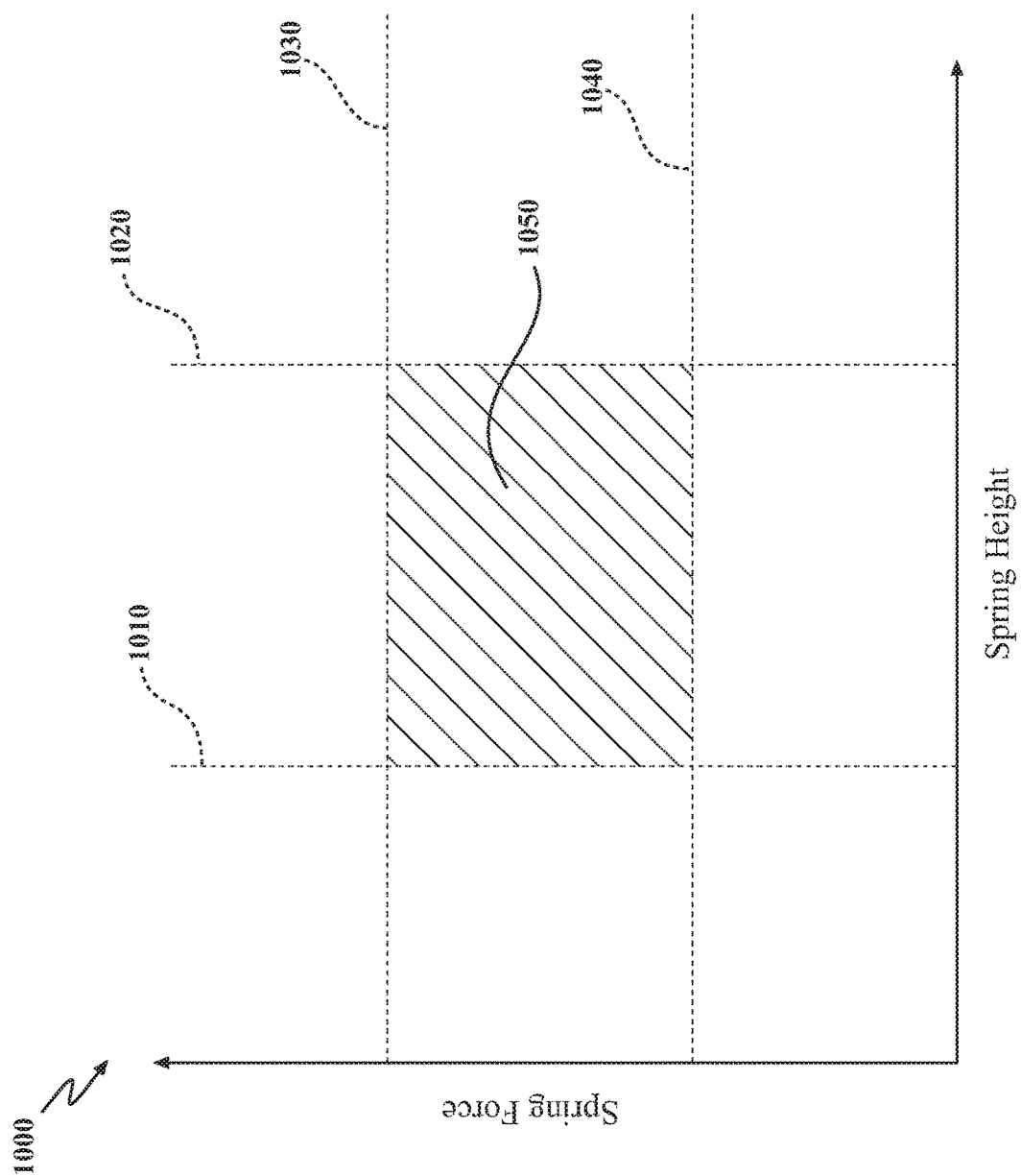
FIG. 10 is a diagram of an embodiment of a spring selection graph 1000.

FIG. 10 is a diagram of an embodiment of a spring selection graph 1000. Graph 1000 may compare spring force on the y-axis with spring height on the x-axis. Line 1010 may represent the working height of a spring. Line 1020 may represent the installed height of a spring. Line 1030 may represent the maximum spring force set by a calibration requirement for separating the separator plates. Line 1040 may represent the minimum spring force set by static friction and normal force between a separator plate and the case for separating the separator plates. The area 1050 represents an ideal range for selection of a spring for use in separating separator plates. Graph 1000 is meant as an example and not meant to limit methods and techniques that may be used for selecting a spring.

Numerous other distributions of springs in an individual separator plate and in a pair of adjacent separator plates are also possible. Any type of spring or spring-like material may be used for separating separator plates.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Aspects herein can be embodied in other forms without departing from the spirit or essential attributes thereof. Accordingly, reference should be made to the following claims, rather than to the foregoing specification, as indicating the scope of the invention.

What is claimed is:

1. A clutch assembly comprising:
    a first separator plate;
    a second separator plate;
    a raised portion extending from one of the first separator plate and the second separator plate, in a direction toward the other one of the first separator plate and the second separator plate;
    an indentation formed in a surface of the other one of the first separator plate and the second separator plate, the surface facing toward the one of the first separator plate and the second separator plate; and
    a coil spring extending between the first separator plate and the second separator plate, the spring having a first end portion mounted on the raised portion so that the raised portion contacts the coil spring along an interior of the coil so as to maintain the spring first end portion in a position directly opposite the indentation, and a second portion received in the indentation, such that when compressed the spring applies a repulsive force separating the first separator plate and the second separator plate.

2. The clutch assembly of claim 1, wherein the first separator plate comprises a first tab and the second separator plate comprises a second tab and wherein the raised portion extends from the first tab and the indentation is formed in a surface of the second tab.

3. The clutch assembly of claim 2, wherein the first tab comprises a first indentation and the second tab comprises a second indentation, and wherein a first end of the spring engages the first indentation and a second end of the spring engages the second indentation.

4. The clutch assembly of claim 2, wherein the first tab comprises an indentation and the second tab comprises a flat external surface, and wherein a first end of the spring engages the indentation and a second end of the spring engages the flat external surface.

5. The clutch assembly of claim 2, wherein the first tab comprises a protrusion and the second tab comprises a flat external surface, and wherein a first end of the spring engages the protrusion and a second end of the spring engages the flat external surface.

6. The clutch assembly of claim 1 further comprising:
    a spring ring comprising the spring, the spring ring between the first separator plate and the second separator plate.

7. The clutch assembly of claim 1 further comprising:
    a third separator plate, the spring contacting the third separator plate, such that when compressed the spring applies a repulsive force separating the first separator plate and the third separator plate.

8. A sub-assembly comprising:
    a separator plate including an annular portion,
    a plurality of tabs, the plurality of tabs being angularly spaced-apart and extending outwardly from an outer edge of the annular portion,
    a raised portion extending from a first surface of a first tab of the plurality of tabs in a direction away from a plane defined by the first surface of the first tab, and
    an indentation formed in a second surface of the first tab opposite the first surface; and
    a first spring mounted on the raised portion so as to prevent movement of an end portion of the spring along the first surface of the separator plate.

9. The separator plate of claim 8, wherein the first tab comprises a first indentation, and wherein a first end of the spring engages the first indentation.

10. The sub-assembly of claim 8, wherein the plurality of tabs further comprises a second tab positioned diametrically opposite the first tab, and a raised portion extending from a surface of the second tab in a direction away from the plane defined by the surface of the first tab, and wherein a second spring is mounted on the raised portion extending from the surface of the second tab.

11. The sub-assembly of claim 10, wherein the first spring is configured similarly to the second spring.

* * * * *